Nov. 7, 1933. J. G. CAPSTAFF 1,933,787
METHOD AND APPARATUS FOR MAKING COLOR MOTION PICTURES
Filed March 5, 1930 5 Sheets-Sheet 1
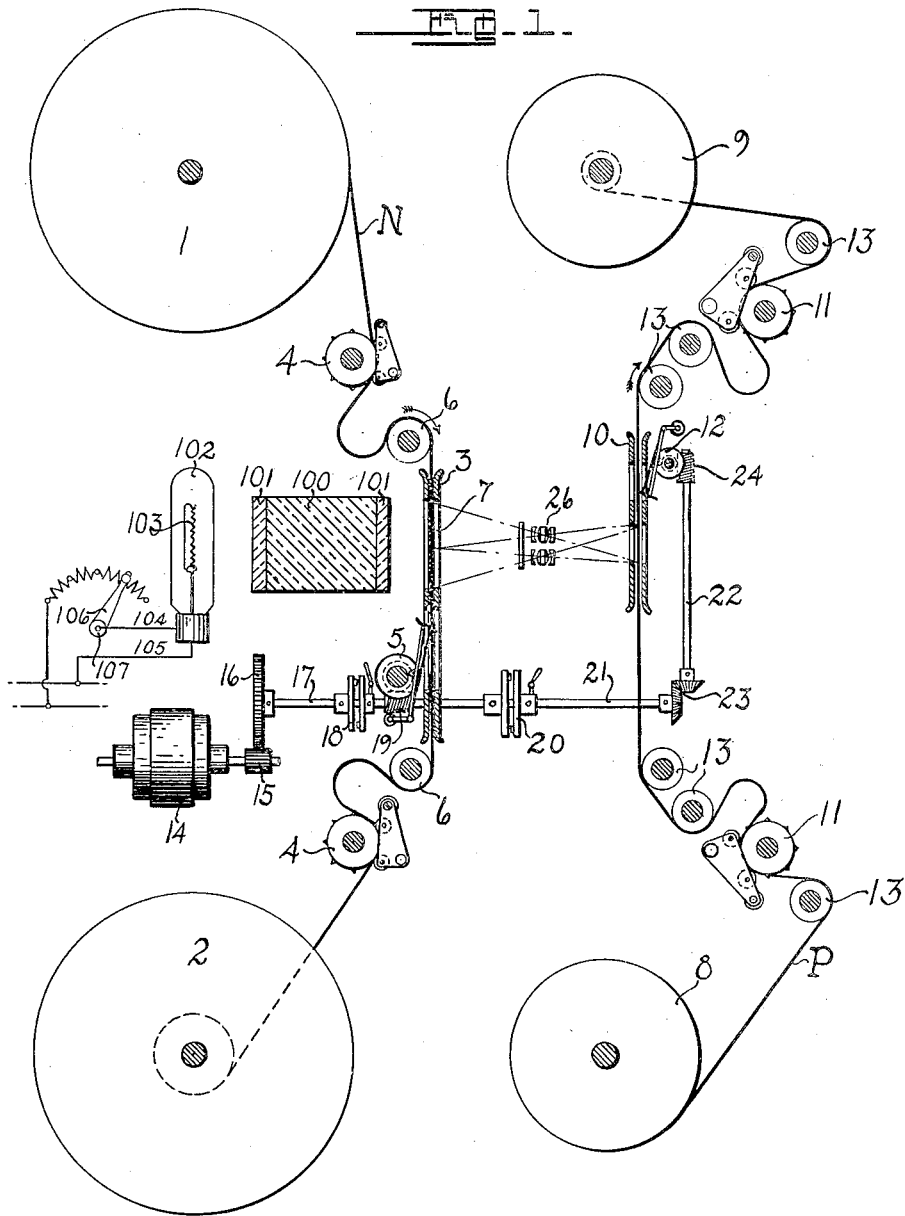
John G. Capstaff,
Inventor

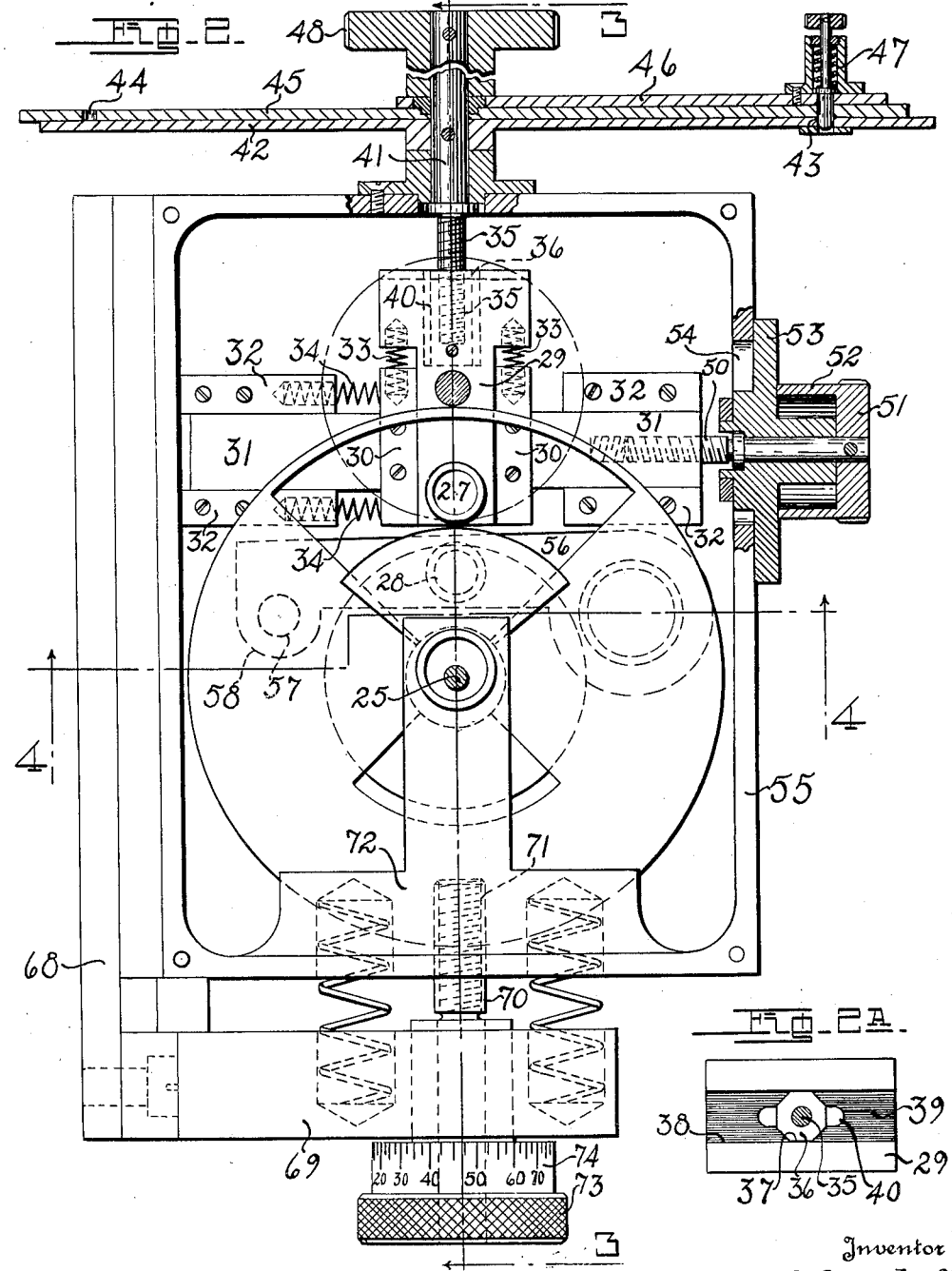

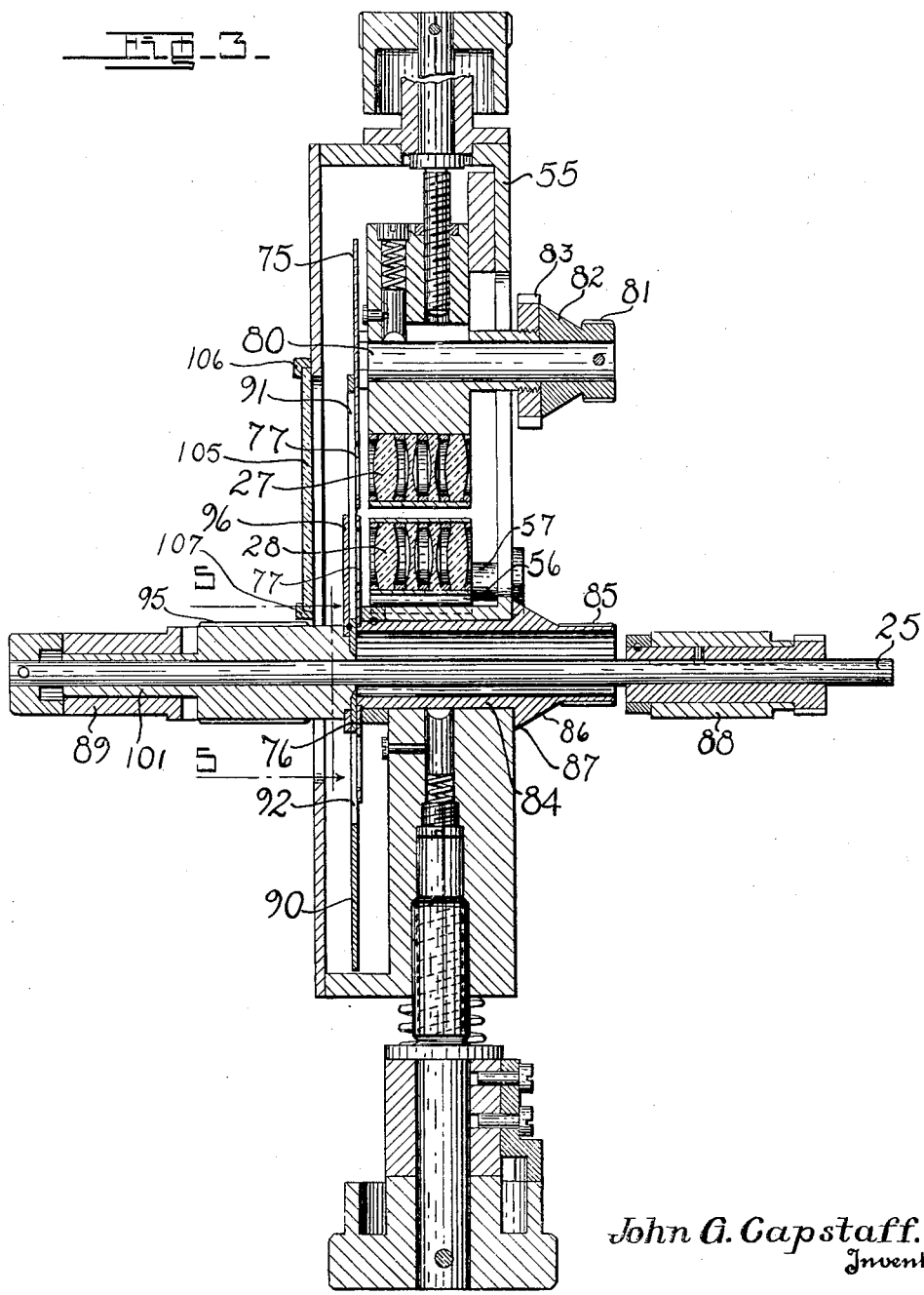

Nov. 7, 1933.　　J. G. CAPSTAFF　　1,933,787
METHOD AND APPARATUS FOR MAKING COLOR MOTION PICTURES
Filed March 5, 1930　　5 Sheets-Sheet 4
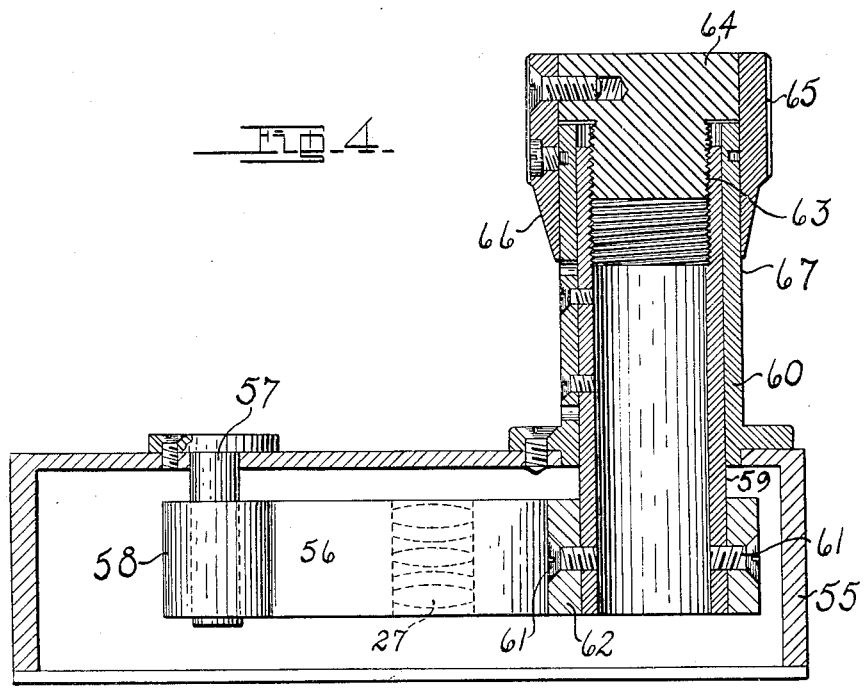
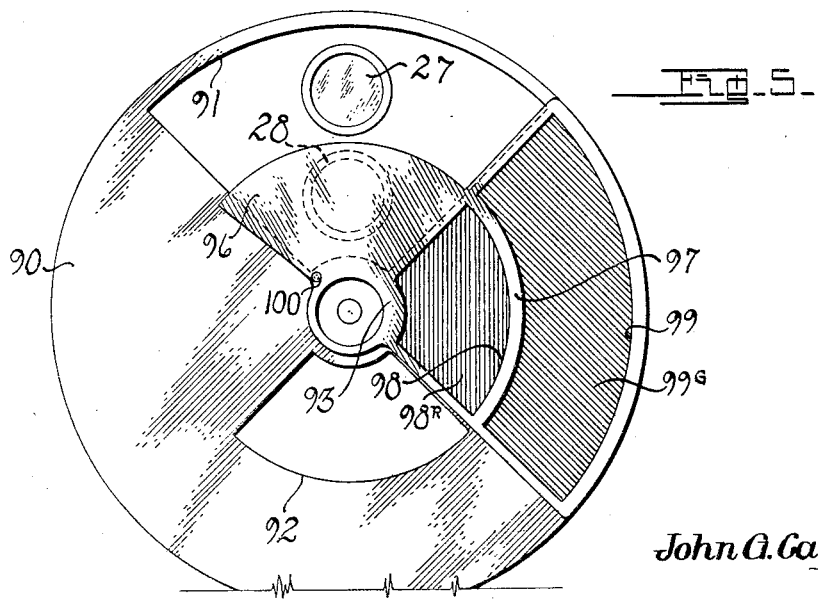
John G. Capstaff.
Inventor

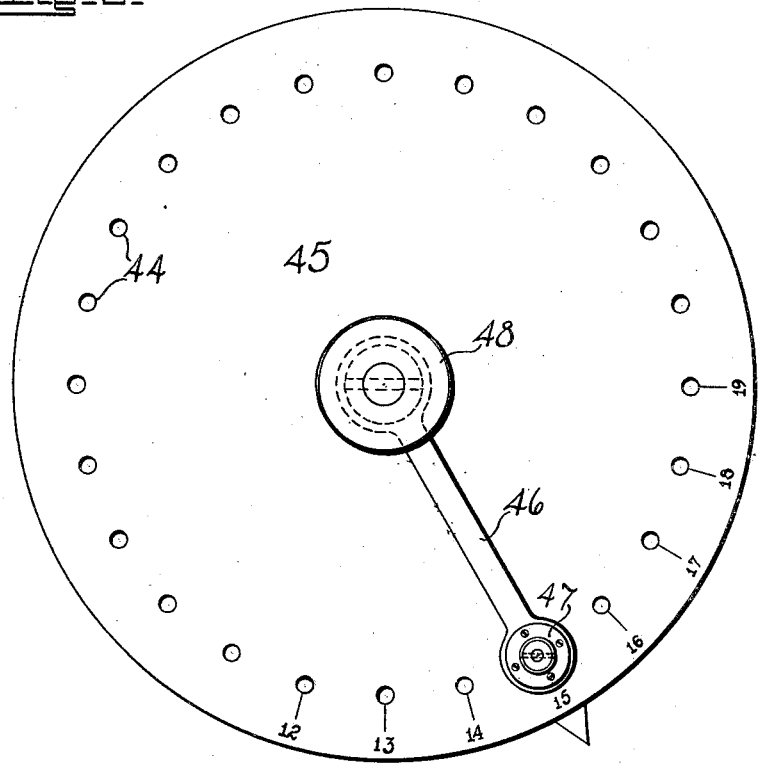
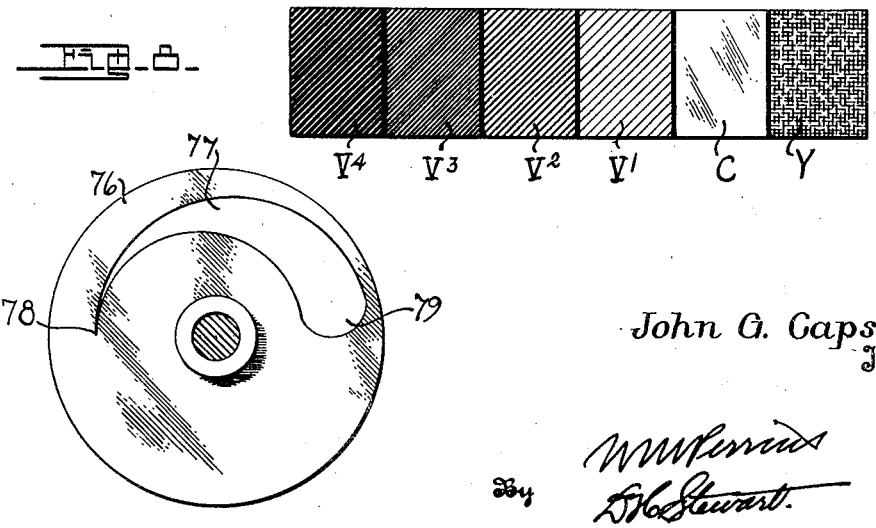

Patented Nov. 7, 1933

1,933,787

UNITED STATES PATENT OFFICE 1,933,787

METHOD AND APPARATUS FOR MAKING COLOR MOTION PICTURES

John G. Capstaff, Rochester, N. Y., assignor to Eastman Kodak Company, Rochester, N. Y., a corporation of New York Application March 5, 1930. Serial No. 433,282

17 Claims. (Cl. 88—24)

This invention relates to photography and more particularly to a method and apparatus for printing motion picture films. One object of my invention is to provide a method and apparatus for correcting inaccuracies of registrations, density, contrast and other errors common to multi-color motion picture photography. Another object is to provide a method of making a completed record of the required quality from the original negative. Another object is to provide a machine with the necessary movements for producing images of the desired character and with which accurate registration can be obtained. Other objects will appear from the following specification, the novel features being particularly pointed out in the claims at the end thereof.

In the production of natural color motion pictures, many difficulties of registration of the component elements of the completed picture occur. These difficulties are due to causes usually beyond the control of the camera man taking the original negative, and some of these will be briefly pointed out.

For instance, in two-color motion picture work it may be necessary to correct in printing for displacement of the color value images. This displacement may be to the right or left, or up or down. Right or left displacement may be due to errors of optical equipment. Up and down displacements may be the result of faulty factory setting of camera lenses and/or beam splitter, or where the beam splitter is not used, when parallax occurs.

Magnification difficulties may occur when there are differences in the optical paths in the camera, especially when a beam splitter is used on close-ups.

Corrections for the varying densities of different scenes on the negative must be made to control the density of the resulting print.

Color ratio differences may occur due to imperfectly matched color filters, the quality of the light, the panchromatism of the film, and the intensities of the split beams. This will result in a picture predominately red or predominately green and the final result, unless corrected, will not, therefore, be true to life, or true to the effect desired.

The corrections for the various errors in the developed camera negative are made normally in making the projection print—that is, between the final print and the master positive, since before this step with known apparatus, there was no way of independently printing the two color frames. This method requires a printer of unusual skill and makes the prints expensive as each print requires individual attention.

My method and apparatus are particularly designed to overcome the expense and tedious work involved in making corrections in the final print.

Coming now to the drawings wherein like reference characters denote like parts throughout:

Fig. 1 is a diagrammatic view of a printing machine constructed in accordance with and embodying a preferred form of our invention;

Fig. 2 is a front elevation of the lens, shutter and focusing device removed from the machine;

Fig. 2A is a detail of a lens adjusting mechanism;

Fig. 3 is a section on line 3—3 of Fig. 2;

Fig. 4 is a detail section through a lens adjusting mechanism;

Fig. 5 is a plan view of the shutter and focusing color screens;

Fig. 6 is a plan view of a presetting dial plate;

Fig. 7 is a plan view of a contrast controlling device, and

Fig. 8 is a light regulating plate.

In its broadest aspects my invention includes a projection printer in which the negative film (bearing a two color record) is moved two frames at a time, and a positive film moves one frame twice during the same cycle.

The two images of the negative may be focused on one frame of the positive to obtain registration, but they are printed successively, that is, red, green, red, green, etc. by means of a special shutter.

The reason for this particular cycle is that it greatly facilitates the production of accurate registration in the master positive. Should there be inequalities of registration in the original negative—and in practice there always are—these are visually corrected. The original negative is not moved by single frames, but by cycles including the complementary color images. In the present instance where two color complementary images are employed the original negative is moved two frames at a time.

By registering the two complementary images on a second film independently, errors in the camera are eliminated in the first step, and are not carried through to the master positive.

Referring to Fig. 1 the negative film N taken in a camera is moved from a supply reel 1 to a take-up reel 2, through a gate 3 over sprockets 4 by a pull-down mechanism 5, the film passing over the usual idlers 6.

Pull-down 5 is of any desired type but must be able to move the film twice as far as usual—that is two frames instead of one. Gate 3 is provided with a two frame opening 7.

The positive film P may be moved from a supply reel 8 to a take-up reel 9 past a gate 10—of single frame size—by passing over sprockets 11 and pull-down 12 and a series of idle rollers 13.

Pull-down 12 is like 5 except that it moves film only one frame at a time. The pull-downs 5 and 12 may be simultaneously operated through motor 14, pinion 15, gear 16 and power driven shafts 17; pull-down 5 through clutch 18 and the worm drive 19, and pull-down 12 through clutch 20, shafts 21 and 22 connected by bevelled gears 23 and a worm drive 24. The pull-downs are thus normally driven in unison in proper timed relation.

The shutter shaft 25, shown in Figs. 2 and 3 is also driven in timed relation to the pull-downs through the motor 14 by a suitable gear connection which is not shown, it being immaterial how the gears are arranged providing the speed of the shutter and pull-downs are properly synchronized.

To properly align, register and position the red and green images the mechanism shown schematically at 26 in Fig. 1 and in detail in Figs. 2, 3 and 4 is employed.

A pair of objectives 27 and 28 are for projecting the images of the red and green sensation negatives to the positive. These objectives are separately mounted and individually adjustable up and down, sideways, toward and from each other and back and forth, singly and together.

Objective 27 is carried by a block 29 movable up and down between the rails 30 and sideways on blocks 31 movable between the rails 32. Springs 33 normally thrust upwardly on block 29, and springs 34 tend to hold the block to the right of Fig. 2.

The up and down movement is accomplished by the screw 35, engaging a nut 36, the edges 37 of which engage the wall 38 of slot 39 which extends entirely across the top of block 29. The screw 35 extends down into an opening 40 in the block so that sideways movement of the block is permitted.

The adjusting means for the up and down movement of block 29 is shaft 41 affixed to plate 42 which constitutes a part of a presetting dial fully described in copending application for patent Serial Number 418,549 filed January 4, 1930, in the name of Harlow D. Phillips.

Briefly the plate 42 has a single aperture 43 in registration with any one of a series of apertures 44 in a dial plate 45, over which an arm 46 carrying a latch 47 operates. By setting the latch handle 48 may be turned to quickly adjust screw 35 to a predetermined setting all as is fully pointed out in the copending application above referred to.

The sideways movement of objective 27 is accomplished by tensioning springs 34 more or less through a block 31 by a screw 50, this screw being movable by a handle 51 having a flange 52 bearing a suitable scale. A plate 53 can slide freely over the slot 54 of frame 55 which itself is movable as will be more fully hereinafter described.

Objective 28 is carried by a mount 56 as best shown in Fig. 4 wherein this mount is shown as slidably mounted on the shaft 57 which engages bearing 58 and the sleeve shaft 59 slidably mounted in sleeve 60. Sleeve shaft 59 engages and is attached by screws 61 passing through the lug 62.

Sleeve shaft 59 has a threaded connection at 63 with the knob 64, knurled at 65 to facilitate turning and having a bevelled surface 66 cooperating with the smooth exterior 67 of sleeve 60, there being a scale and pointer on parts 66 and 67 to determine the setting of the parts.

In addition to being movable separately, objectives 27 and 28 are movable together with frame 55 on a slideway 68 which may be a part or attached to the main frame of the machine, and which frame has a projection 69.

Through this projection 69 a screw 70 passes, being threaded into the female thread 71 in part 72 of frame 55. A knurling 73 and scale 74 is for accurate adjustment. By moving the frame 55 both objectives are moved up or down together.

To balance the relative intensity of the two images formed by the objectives 27 and 28, one or two diaphragming devices may be employed. In the present embodiment I provide two diaphragms 75 and 76 which are just alike and are, as shown in Fig. 8, provided with a wedge-shaped opening 77 tapering from a fine point 78 to a large rounded opening 79 adapted to pass all of the light through one of the objectives.

Diaphragm 75 is mounted to control the light passing through lens 27 and may be adjusted by shaft 80 through the knurled member 81 having a flange 82 coming close to a disk 83, a suitably marked scale and pointer are carried by flange 82 and disk 83.

Diaphragm 76 controls the light passed by objective 28 being mounted on a sleeve shaft 84 having a knurling 85, and flange 86 adapted to cooperate with a flat surface 87 so that a suitable scale and pointer may be inscribed on these parts.

Shaft 84 is a sleeve shaft, the internal diameter of which provides room for free movement of the shutter shaft 25 which turns in fixed bearings 88 and 89 in timed relation to the pull-down mechanisms. This permits frame 55 to move far enough to accomplish the desired movements without touching the shaft 25. The required range of movement of frame 55 is not over .05 inch in the present embodiment, although this is, of course, determined by the magnification of the objectives employed.

The shutter shaft 25 turns a shutter 90 best shown in Fig. 5. This comprises a circular plate having a cut-out portion 91 on one side and a cut-out 92 opposite thereto. These openings differ in that opening 92 permits light to pass through only objective 28 whereas 91 permits light to pass through both objectives for focusing and through only objective 27 when in the operative position shown in Fig. 5.

A focusing shutter 93 is mounted on a sleeve 94 knurled at 95 to facilitate turning relative to the shutter. This focusing shutter comprises an opaque section 96 adapted to normally cover a portion of opening 91 and a portion 97 having arcuate slots 98 and 99 covered with red and green filters 98$^R$ and 99$^G$.

The focusing shutter is adapted to be normally retained in the position shown by a "pimple and dimple" snap latch indicated at 100. The tendency is for the focusing shutter to turn with shaft 25, but when the shaft is not turning the knurling 95 can be turned to move the focusing shutter either into a position at substantially 90° to the right in Fig. 5 thus leaving all of opening 91 exposed for focusing with white light, or in a position at substantially 90° to the left in Fig. 5, thus bringing the red and green filters 98$^R$ and 99$^G$ over opening 91.

For some purposes as titles, for instance, it is preferable to focus with natural colored light. Some views can be more readily focused by bringing the red and green images into registration to produce a colored image. Either method of focusing can be employed with the focusing shutter as above described. While it is better practice to turn the knurling 95 back to its original position, on starting shaft 25, through the frictional contact of part 101 which extends into bearing 89 the sleeve will tend to be retarded until the pimple and dimple connection 100 snaps into place and the parts will rotate together in the operative position for printing shown in Fig. 5.

In case it is necessary or desirable to alter contrast the slide 105 (Fig. 7) may be slid across the window 106 in grooves 107 so that any one of the different densities of violet $V^1$, $V^2$, $V^3$ or $V^4$ may be used or the yellow filter Y may be placed to intercept the light beams. C is a clear or colorless area which does not affect contrast.

The quartz block 100 and if desired, with the diffusing mediums 101 can be used to bring forward light from a lamp 102 which may have a concentrated filament 103. Power is derived through wires 104 and 105 and through a rheostat 106 adjustable by a handle 107. After the correct light intensity for any scene is once found, the rheostat setting can be repeated at will.

The colored filters are what I prefer to call contrast filters: the violet filters of different densities tend to flatten or soften the positive made from the negative. The yellow filter is for increasing the contrast.

If a trial print projected on a screen is predominately red or green a diaphragm 76 may be adjusted to correct for the error in the color.

It is sometimes advantageous to register the images in black and white for fine focusing and registration adjustments and when this is to be accomplished the color filters are moved from the path of light by the knurling 95.

Having thus described my invention, what I claim as new and desire to secure by Letters Patent is:

1. The method of printing from complemental color images of the same subject that comprises projecting said images in registration upon the same printing window, bringing such images into proper registration and focus at the window, and then exposing different portions of the same sensitive element in succession to the said registered projected complemental images respectively, each portion being exposed to only one image.

2. The method of printing from complemental color images of the same subject that comprises projecting said images in registration upon the same printing window and in the same plane, bringing said images into overlapping registration on said plane, printing one of said images on an area of film passed through said plane at said exposure window, moving the film and printing another of said images on another area of said film.

3. The method of printing from complemental color images of the same subject on a single film that comprises projecting a set of complementary color images simultaneously in overlapping relation upon the same plane at a single film gate, and printing said images one at a time on separate areas of a single film moved through said film gate.

4. In a photographic printer, the combination with spaced double frame and single frame gates past which film may be drawn, with adjustable objectives adapted to register two complementary images in the double frame gate upon the single frame gate, and a movable shutter adapted to pass light from one objective, cover both objectives, pass light from the other objective, and cover both objectives all in one cycle of movement.

5. In a photographic printer, the combination with spaced double frame and single frame gates past which film may be drawn, with adjustable objectives adapted to register two complementary images in the double frame gate upon the single frame gate, and a rotatable shutter disk including a pair of arcuate slots lying opposite to each other, one being aligned to pass light from one objective only and the other being aligned to pass light from the other objective only.

6. In a photographic printer, the combination with spaced double frame and single frame gates past which film may be drawn, with adjustable objectives adapted to register two complementary images in the double frame gate upon the single frame gate, and a rotatable shutter disk including a pair of arcuate slots lying opposite to each other, one being aligned to pass light from one objective only and the other being aligned to pass light from the other objective only, the slots each extending through a substantially similar angle.

7. In a photographic printer, the combination with spaced double frame and single frame gates past which film may be drawn, with adjustable objectives adapted to register two complementary images in the double frame gate upon the single frame gate, a pull-down mechanism for each gate, one adapted to advance film two frames and the other adapted to advance film one frame at each operation of the pull-down, and a shutter including a disk having two arcuate openings unequally spaced from the center thereof for permitting light to pass through only one of the objectives at one time.

8. In a photographic printer, the combination with spaced double frame and single frame gates, past which film may be drawn, with adjustable objectives adapted to register two complementary images in the double frame gate upon the single frame gate, a double pull-down mechanism for the double frame, a singe pull-down for the single frame, mechanism for operating the pull-downs in timed relation, gearing included in the mechanism for operating the single pull-down twice for each single actuation of the double pull-down.

9. In a photographic printer, the combination with spaced double frame and single frame gates past which film may be drawn, of objectives between said gates adapted to focus images from the double gates upon the single gate, and a shutter lying between the gates comprising an apertured disk, one aperture adapted to pass light from one objective, the other aperture adapted to pass light from both objectives, and a second member adapted to cover a part of the aperture of the shutter which may pass light from both objectives.

10. In a photographic printer, the combination with spaced double frame and single frame gates past which film may be drawn, of objectives between said gates adapted to focus images from the double gates upon the single gate, and a shutter lying between the gates comprising an apertured disk, one aperture adapted to pass light from one objective, the other aperture adapted to pass light from both objectives, and a second member adapted to cover a part of the aperture of the shutter which may pass light from both objectives and manual means for adjusting the second member to and from a position in which it may cover a part of the said shutter aperture.

11. In a photographic printer, the combination with spaced double frame and single frame gates past which film may be drawn, of objectives between said gates adapted to focus images from the double gates upon the single gate, and a shutter lying between the gates comprising an apertured disk, one aperture adapted to pass light from one objective, the other aperture adapted to pass light from both objectives, and a second member adapted to cover a part of the aperture of the shutter which may pass light from both objectives, a pair of color filters carried by the second member, and means for moving the second member relative to the shutter to position the filters over the shutter aperture passing light from both objectives, whereby one objective may pass light through one color of the filter and the other may pass light through the other color filter.

12. In a photographic printer, the combination with spaced double frame and single frame gates past which film may be drawn, of objectives between said gates adapted to focus images from the double gates upon the single gate, and a shutter lying between the gates comprising an apertured disk, one aperture adapted to pass light from one objective, the other aperture adapted to pass light from both objectives, and a second member adapted to cover a part of the aperture of the shutter which may pass light from both objectives, a pair of color filters carried by the second member, and means for moving the second member relative to the shutter to position the filters over the shutter aperture passing light from both objectives whereby one objective may pass light through one color of the filter and the other may pass light through the other color filter and manual means for moving the objectives whereby a two color image may be produced by bringing the two color images into registration.

13. In a photographic printer, the combination with spaced double frame and single frame gates past which film may be drawn, of objectives between said gates adapted to focus images from the double gates upon the single gate, and a shutter lying between the gates comprising an apertured disk, one aperture adapted to pass light from one objective, the other aperture adapted to pass light from both objectives, and a focusing shutter movably mounted on the shutter, said focusing shutter being adapted to normally turn with the shutter in a fixed relation thereto, a handle connected to the focusing shutter for moving the focusing shutter with respect to the shutter.

14. In a photographic printer, the combination with spaced double frame and single frame gates past which film may be drawn, of objectives between said gates adapted to focus images from the double gate upon the single gate, and a shutter lying between the gates comprising an apertured disk, one aperture adapted to pass light from one objective, the other aperture adapted to pass light from both objectives and a focusing shutter movably mounted on the shutter, a latch adapted to hold the focusing shutter in a fixed position on the shutter and a handle for moving the focusing shutter from this fixed position for focusing.

15. The method of printing from complemental color images of the same subject on a single negative film that comprises simultaneously projecting one set of complementary color images through a multiple frame gate in overlapping relation upon a plane in a single frame gate, registering said images, printing from one of said frames at a time upon a film positioned in said single frame gate, moving said film and printing from another of said images upon a positive film without moving said negative film.

16. The method of printing from a two-color selection negative film having thereon complemental images of the same subject on different areas thereof that comprises simultaneously projecting a pair of complemental color selection images upon a single plane in a single film gate, registering said images accurately, passing a film to be printed upon through the single film gate, printing one image from one complemental image on said film, moving said film, printing the other complemental image upon another area of said film without moving said negative film.

17. The method of printing from a two-color selection negative film having thereon complemented images of the same subject on different areas thereof that comprises simultaneously projecting a pair of complemental color selection images upon a single plane in a single film gate, registering said images accurately, passing a film to be printed upon through the single film gate, printing one image from one complemental image in said film, moving said film, printing the other complemental image upon another area of said film without moving said negative film, moving said negative film and repeating said alternate printings.

JOHN G. CAPSTAFF.